Aug. 17, 1937.  F. L. O. WADSWORTH  2,090,082
MECHANISM FOR SEVERING MOLTEN GLASS
Original Filed March 21, 1934   2 Sheets-Sheet 1

INVENTOR
Frank L. O. Wadsworth
By Green & McCallister
His Attorneys

INVENTOR
Frank L. O. Wadsworth
By Green & McCallister
His Attorneys

Patented Aug. 17, 1937

2,090,082

UNITED STATES PATENT OFFICE 2,090,082

MECHANISM FOR SEVERING MOLTEN GLASS

Frank L. O. Wadsworth, Pittsburgh, Pa., assignor to Ball Brothers Company, Muncie, Ind., a corporation of Indiana Original application March 21, 1934, Serial No. 716,626. Divided and this application June 24, 1935, Serial No. 28,096. Renewed January 8, 1937

20 Claims. (Cl. 49—14)

This invention relates to the art of severing individual mold charges from a suspended stream of molten glass, and more specifically to improvements in the method and apparatus for severing a continuously moving and pulsating stream without retarding or otherwise interfering with the flow of material, and is a division of my application serially Numbered 716,626, filed March 21, 1934.

One of the important objects of my invention is to provide means for severing a continuously moving stream of molten glass—having a succession of enlarged sections connected together by intervening "neck" portions of lesser diameter— at the points of reduced section into a series of mold charges without interfering with or retarding the flow through the orifice during the severing operation and with the minimum chilling or distortion of the portion of the stream engaged by the severing elements.

Another object of this invention resides in a shear mechanism for periodically severing such a stream of molten glass at its point of reduced cross section which will actually assist the flow through the orifice and accelerate the delivery or removal of the successively severed sections to the receiving molds or receptacles in which they are to be subsequently fabricated.

These and other objects which will be hereinafter made apparent to those skilled in this particular art are accomplished by means of this invention, two embodiments of which are illustrated in the accompanying drawings, wherein.

Figure 1:
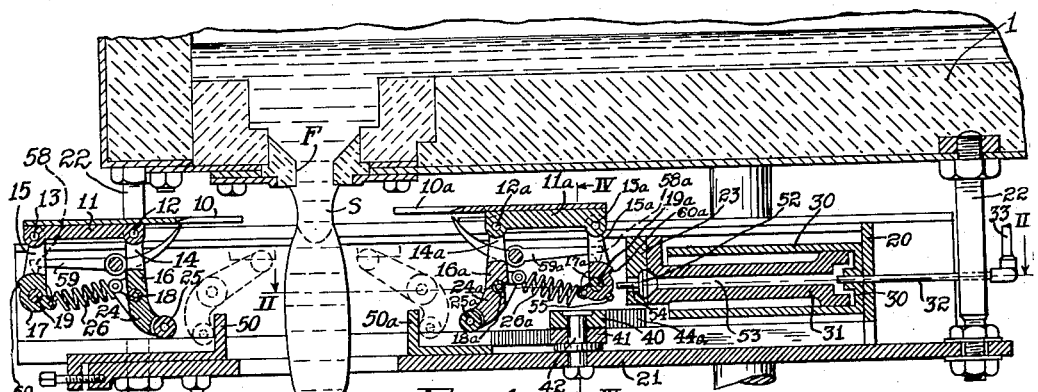
Figure 1 is a vertical section through the center of an improved apparatus for carrying out my process of severing a stream of molten glass and illustrates the position of the apparatus relative to the flow orifice of a forehearth or container for the molten glass.
Figure 2:
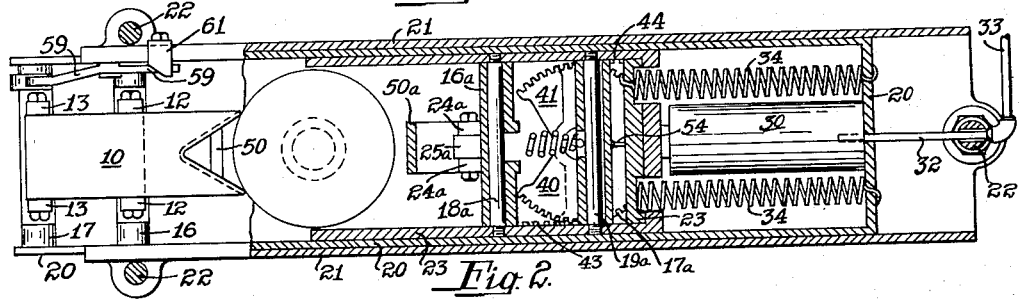
Fig. 2 is a plan view, partially in horizontal section of the apparatus illustrated in Fig. 1.
Figure 3:
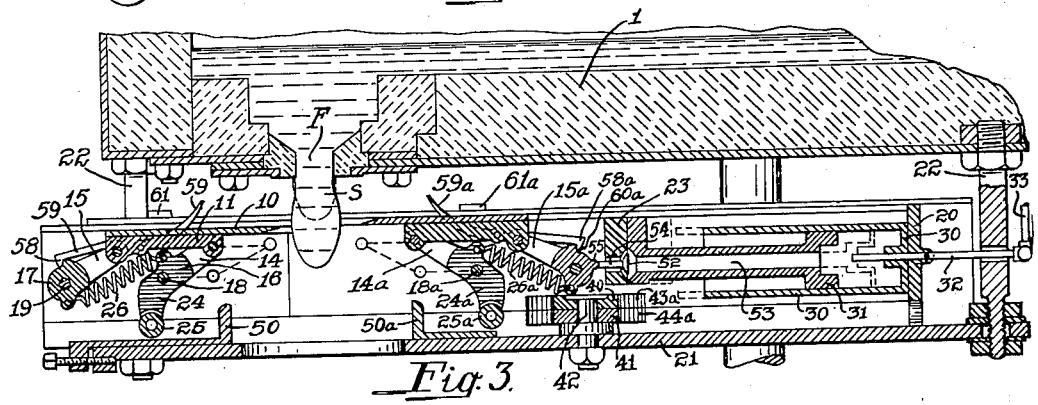
Fig. 3 is a sectional view similar to Fig. 1 and illustrates the position of the shears as they are being retracted at the end of a severing operation.

In general my improved apparatus for severing a stream of glass into individual mold charges comprises a pair of opposed shear blades which are mounted on each side of a stream of glass S which is being fed in a continuous stream through an orifice F in a forehearth or container I. The molten glass may be fed through the orifice F by any suitable feeding mechanism, such as the usual "sticky plunger" and air bell type of feeders (none shown) which are adapted to feed the molten glass in a continuous but pulsating stream through the orifice F to provide a series of regularly recurrent enlarged sections which are connected together by portions of reduced section.

To sever the stream S at these points of reduced section, the opposed shear blades are moved into cutting engagement with each other during the period of decelerated or reduced flow, i. e., at the time of the formation of reduced sections of the stream to prevent the stub of glass protruding through the orifice F from piling up on the shear blades during the time they are in contact with the stream, the blades are moved in the direction of flow of the stream during the severing operation. This movement of the shear blades in the direction of flow of the stream S is preferably at a speed greater than the rate of flow of the stream, and consequently a force is applied to each individual gob or mold charge severed from the stream which accelerates the delivery of the severed gob or charge to the receiving mold or receptacle.

To prevent the stub of glass projecting through the orifice F after the severance from being distorted, I prefer to retract the shear blades while they are in their lowermost position or when they are still moving downwardly so that they cannot interfere with the oncoming stream of glass or with the next succeeding mold charge. This downward movement of the shear blades with the stream during the severing operation not only tends to accelerate the delivery of the severed charge to the receiving mold, but also assists in and speeds up the oncoming flow through the orifice F.

Referring to the drawings in detail, the shear mechanism illustrated in Figs. 1 to 5, inclusive, comprises a pair of opposed shear blades 10—10a, of the usual reentrant V or "cat's eye" cutting edge type, which are respectively secured to the upper faces of the members 11—11a. Each of the blade supporting members 11—11a is pivotally attached at 12—13 and 12a—13a to the upper ends of a dual pair of parallel link arms 14—15 and 14a—15a, which are respectively secured to bearing sleeves 16—17 and 16a—17a that are rotatably mounted on cross shafts 18—19 and 18a—19a. The ends of the shafts 18—19 are secured in the sides of a U-shaped member 20 which is slidably mounted between the sides of a box frame 21 that supports the shear mechanism, as a whole, and which itself is adjustably supported on the rods 22 depending from the bottom plate of the forehearth 1. The ends of the shafts 18a—19a are secured to the sides of a second U-shaped member 23 which is slidably mounted within the legs of the U-shaped member 20.

Each of the sleeve members 16—16a is provided with a pair of spaced arms 24 and 24a which extend downwardly therefrom, and each pair carries a roller 25—25a, the purpose of which will be hereinafter described. Each pair of links 14—15 and 14a—15a is normally held in a substantially vertical position (as shown in full lines in Fig. 1) by means of tension springs 26—26a whose ends are attached to each set of links on opposite sides of their shaft supports 18—19 or 18a—19a.

When the shear blades 10—10a are to be closed, the U-shaped members 20 and 23 are moved in opposite directions on the frame 22, by means of a cylinder-piston assembly 30—31, which is disposed between the crossheads of the U-shaped members 20—23 with the outer end of the cylinder 30 attached to member 20 and the inner end of the piston 31 attached to the U-shaped member 23. The cylinder and the piston are concurrently moved in opposite directions by a suitable motive fluid, such as compressed air, which is admitted to the cylinder through a pipe 32 slidably mounted in the connected heads of the U-shaped member 20 and the cylinder 30, and connected to a pipe 33 leading to a suitable timer valve (not shown) adapted to periodically connect the cylinder 30 to a source of motive fluid such as compressed air, and to atmosphere. The cylinder and piston members 30—31 are normally held in their closed position and are retracted when the timer valve is connected to atmosphere by means of coil springs 34—34 whose opposite ends are attached to the crossheads of the U-shaped members 20 and 23.

When it is desired to sever the stream of molten glass flowing through the orifice F, the timer valve, which controls the admission of motive fluid to cylinder 30 and which is preferably operated in timed relation to the feeder mechanism, is actuated to connect the pipes 33—32 to the source of compressed air.

Figures 4, 5:
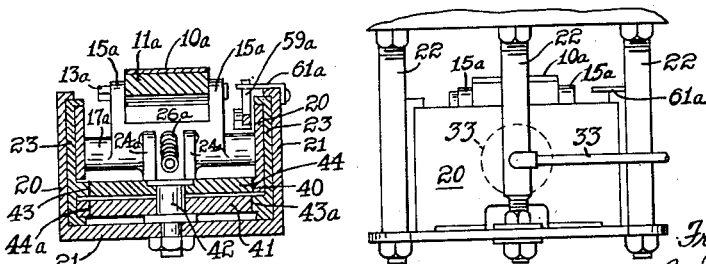
Fig. 4 is a sectional view taken on line IV—IV of Fig. 1.
Fig. 5 is a view in end elevation of the shear mechanism.

As soon as compressed air is introduced into the cylinder 30, the piston 31 and the head of the cylinder are concurrently moved in opposite directions, and carry with them the U-shaped members 20—23. These moving parts are constrained to travel at the same speed relative to the supporting frame 21 by a pair of segmental control pinions 40—41 which are rotatably mounted, one above the other, on a stud bolt 42 that is rigidly secured in the bottom plate of the frame 21; and are arranged to engage with rack bars 43—43a and 44—44a that are respectively attached to the U-shaped members 20 and 23. The pinion 40 engages on one side with the rack bar 43 on the member 20 and on the other side with a rack bar 44 on the member 23; while the pinion 41 engages on the opposite sides with the rack bar 43a on the member 20, and with the rack bar 44a on the member 23 (Fig. 4).

To impart a "dropping" movement to the shear blades 10—10a so that they may travel with the molten material during the severing operation—stops 50—50a are adjustably mounted on the frame 21 and are so positioned as to engage the rollers 25—25a, as the parallel supports 20 and 23 move in opposition to each other, and bring the cutting edges into contact with the surface of the flowing stream. As soon as this engagement occurs, the continued movement of the frames 20 and 23 rock the link arms 14—15 and 14a—15a, in opposite directions and cause the shear blades to move downwardly as they pass into and through the stream of glass (as indicated in dotted lines in Fig. 1). The ratio between the transverse and axial movement of the cutting edges, during this severing operation, can be varied within wide limits by altering the relation between the length and the angular inclination of the link arm elements 14—15, 14a—15a, and 24—24a, and also by changing the position of the stops 50—50a; but I prefer, in most cases, to so proportion and adjust these relationships that the shear blades will pass through the flowing stream at an angle of approximately 45° to the axis thereof.

In order to exhaust the air from the cylinder 30 and permit the springs 34—34 to return the support members 20—23 to their original position, after the severing operation has been completed, I provide a vent valve 52 which is mounted in the crosshead of the frame 23, and which serves to normally close the outer end of the passageway 53 in the tubular piston member 31. This valve 52 is held in its closed position by the pressure of the fluid in the cylinder 30; and is adapted to be opened by the engagement of the valve stem 54, with a lug 55 on the sleeve 17a, when the latter has been rocked to such position—by the inward movement of the correlated parts 23—31—as to completely close the shear blades 10—10a.

It is desirable to hold the shear blades 10—10a in their depressed position, while they are being retracted, and thus prevent them from coming into contact with the oncoming end of the severed stream; and in order to effect this result I provide a pair of locking dogs 58—58a which are carried by arms 59—59a that are pivotally mounted on the members 20—23 and which engage respectively with lugs 60—60a, on the sleeves 17 and 17a when the link arms 15 and 15a have been rocked inwardly to the shear closing position, and thus prevent the return springs 26—26a from acting on these links until the dogs 58—58a have been released. When the blades are fully retracted, the upturned ends of the arms 59—59a are engaged by angle clips 61—61a, secured to the sides of the frame 21, and the dogs or latches 58—58a are disengaged from the lugs, thus permitting the springs 26—26a to return the parallel link systems 14—15 and 14a—15a to their original position.

Briefly restated, the operation of the shear mechanism is as follows: When the glass is issuing through the orifice F under the influence of gravity alone—or under the decelerated velocity of flow that occurs at the end of the down stroke of the plunger—the timer valve mechanism controlling the admission of compressed air to the cylinder 30 is actuated and motive fluid is then delivered to the cylinder. As the air enters the cylinder and passes through the hollow piston 31, it closes the valve 52 and the piston and the cylinder are concurrently moved in opposite directions, at the same rate of speed, thus advancing the shear blade carriages 20—23 toward the stream flowing through the orifice F. This movement brings the rollers 25—25a into engagement with the stops 50—50a at a time when the shear blades are about to enter the flowing stream; and the further movement of the members 20—23 cause the parallel link systems 14—15 and 14a—15a to rock inwardly, on their shaft supports 18—19 and 18a—19a, thus imparting a concurrent transverse and downward movement to the shear blades 10—10a as they cut through the stream. At the completion of this cutting movement the dogs or latches 58—58a drop over the cam lugs 60—60a and lock the parallel link systems and the supported shear blades in their lowermost and closed position.

At the same time that the locking latches 58—58a engage the lugs 60—60a, the lug 55 engages the valve stem 54 and opens the valve 52, to connect the interior of the cylinder 30 to atmosphere, and permit the spring members 34—34 to return the shear blade carriages 20—23 to their original relationship (Fig. 1). At, or near, the end of this return movement, the upturned ends of the arms 59—59a are engaged by the clips 61—61a, and the locking elements 58—60 and 58a—60a are disengaged, to allow the springs 26—26a to retract the link arms and raise the connected shear blade supports 11—11a to their initial upper position, in readiness for the next severing operation. The time relationship of these successive return movements will be readily understood by referring to Fig. 3, which shows the various parts of the mechanism in the positions which they occupy at an intermediate point in the backward travel of the carriages 20—23. It will of course be understood that at some time prior to the release of the locking elements 58—60 and 58a—60a, the timer valve has been again operated to close the connection between the source of compressed air and the line 33 and thus shut off the flow of compressed air to the cylinder 30.

Figure 6:
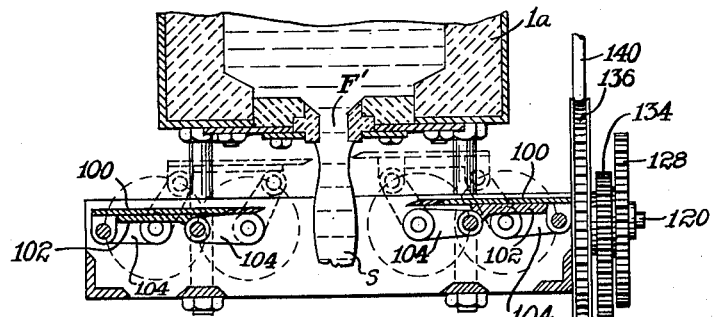
Fig. 6 is a view in vertical section of another embodiment of my improved shear mechanism.
Figure 7:
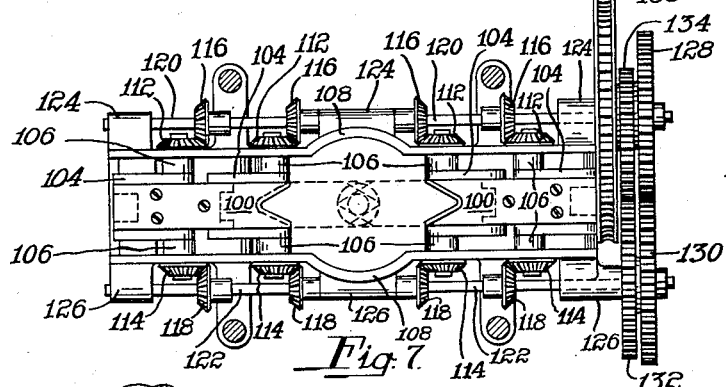
Fig. 7 is a plan view of the shear mechanism illustrated in Fig. 6.
Figure 8:
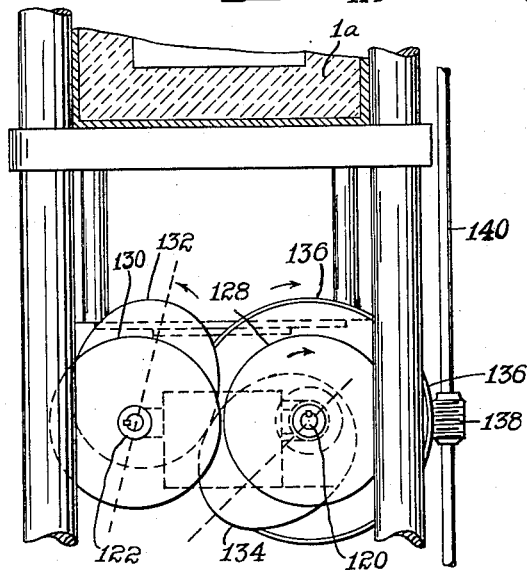
Fig. 8 is a view in end elevation of the apparatus and illustrates the gears for driving the shears.

In Figs. 6 to 8, inclusive, I have illustrated another exemplification of my improved shear mechanism for periodically severing a stream S of molten glass which is being fed by any suitable feeding mechanism through an orifice F' in a forehearth 1a in a continuous stream of regularly recurrent, enlarged sections which are connected together by portions of reduced areas. This embodiment of my improved shear mechanism which is also adapted to travel with the stream during the severing operation comprises a pair of opposed shear blades 100 that are mounted on plates 102, each of which is pivotally supported on a pair of parallel cranks 104. The ends of the cranks 104 extend through and are journaled in bearings 106 on the sides of a box-shaped frame 108 that is suspended from the bottom of the forehearth 1a by means of the posts 110. The ends of each of the cranks 104 extend through the sides of the box frame 108 and are provided with miter gears 112—114 that are in engagement with corresponding miter gears 116—118 which are secured to side shafts 120, 122, respectively. These side shafts 120—122 are journaled in bosses 124—126 projecting outwardly from the sides of the frame 108 and are connected to revolve in opposite directions by spur gears 128—130. One of these spur gears 130 is secured to an elliptical gear 132 that is engaged by a companion elliptical gear 134 which is attached to the side of a larger worm wheel 136 and which is mounted to revolve freely on the adjacent end bearing on the side shaft 120. The worm wheel 136 is continuously revolved at a substantially uniform speed by a worm 138 on a continuously driven motor shaft 140 from which the feeder mechanism is also preferably driven.

From this construction it is apparent that the uniform angular velocity of the connected gear elements 136—138 is periodically varied or changed by the elliptical gears 132—134 into an alternately accelerated and decelerated movement of the side shafts 120—122.

When the apparatus is in operation the cranks 104 carrying the shear blade supports 102 are continuously rotated with the ends of cutting elements 100 describing a circle, and as a result, are symmetrically moved toward and away from each other in parallel planes, and are also moved alternately down and upward during successive half revolutions of the shafts 120—122. The arrangement of the elliptical gears 132—134 is such that the greatest velocity is imparted to the shafts 120—122 at the time when the shear blades 100 are cutting through the flowing material S and at this time the shear blades are also traveling downwardly at their maximum speed which is preferably greater than the movement or rate of flow of the stream S through the orifice F'.

From the foregoing description it is readily apparent that with my improved shear mechanism the continuously flowing stream of molten material is cut in such a way that the "piling up" of the material on the shear blades is avoided by the movement of the shear blades downwardly with the stream during the severing operation, and distortion of the severed stub is also avoided by retracting the shear blades when they are in their lowermost position or while they are still moving downwardly, and as a result they cannot interfere with the oncoming stream of glass or with the formation of the next mold charge. This downward movement of the shear blades with the stream during the cutting operation, in fact, assists the oncoming flow and since the shear blades move downwardly at a greater rate of speed than the rate of flow of the stream, they also accelerate the delivery of the severed gob to the receiving mold or receptacle of the forming machine where the gob is to be fabricated. I desire it to be understood that I have devised various shearing structures and shearing procedures for severing a continuously flowing stream of molten glass to produce mould charges and in which the shear blades move downwardly with the stream and that such structures and procedures not only distinguish structurally and functionally from the features herein claimed but form the subject-matter of and are claimed in co-pending applications for patents.

With the preceding disclosure as a guide, those skilled in the art will be able to recognize and appreciate other advantages of the present invention which may not have been specifically pointed out herein and will be able to derive various other forms of apparatus that might be used to practice my improved mode of procedure without departing from the spirit of my invention or the scope of the appended claims.

What I claim as new and desire to secure by Letters Patent is:

1. A severing mechanism for continuous flow feeders, comprising blades located on opposite sides of the stream to be cut, means for moving each such blade through a circular path, with the path of one blade intersecting the path of the other blade to impart a downward movement to the blades as they cross each other in cutting relation, and means for varying the speed of such movement during the operation of cutting the stream.

2. A severing mechanism for continuous flow feeders, comprising two opposed and parallel shear blades, a sliding frame for each blade, means for reciprocating said frames to move the blade toward and away from each other, means responsive to the movement of said frames in one direction for moving each blade through an arc, and means for continuously maintaining said blades in parallel relation.

3. A shear mechanism comprising opposed shear blades, means for moving said blades toward each other into cutting engagement, links connected to said blades for imparting a downward movement thereto as they approach each other in cutting engagement, means for locking said blades in their lower position, means for retracting said blades and means operable after said blades have been retracted from cutting position for releasing said blade-locking means.

4. A shear mechanism comprising a pair of opposed shear blades, adapted to be moved across each other in cutting engagement, a pivoted linkage support for each blade adapted to impart a downward movement to said blades during the closing thereof, means for moving said blades to their closed and lowered position, means for releasably locking said blades in their lowered position, means for retracting said blades, means for releasing said blade-locking means, and means for returning said blades and their linkage supports to their initial position.

5. A shear mechanism comprising a pair of opposed shear blades, a pair of parallel pivoted links supporting each of said blades, means for yieldably holding said links in a vertical position, means for moving said blades toward each other, means for rocking said links to impart a downward movement to said blades during the movement thereof, means for locking said blades in their lowered position, means for retracting said blades, and means for releasing said blade-locking means during the retraction of said blades.

6. A shear mechanism comprising a pair of opposed shear blades, a pair of parallel link mechanisms pivotally connected at one end to each of said blades, movable means for supporting the other ends of each set of link mechanisms, means for moving said link mechanism supporting means to move said blades into cutting engagement with each other, means for rocking said link mechanisms to impart a downward movement to the blades while in cutting position, means for yieldingly locking said blades in their lowered position, means for retracting the link supporting mechanisms, and means for releasing said blade-locking means.

7. A shear mechanism comprising a pair of opposed shear blades, rotatable means for supporting said blades in parallel horizontal planes, means for rotating said blade supporting means to move the blades in intersecting circular paths whereby the blades cross each other in cutting engagement, and means for alternately accelerating and decelerating said blade rotating means.

8. A shear mechanism comprising a pair of opposed shear blades, a pair of cranks pivotally connected to each of said blades, means for rotating said cranks to move said blades through a circle and into and out of cutting engagement with each other, and means for periodically varying the speed of rotation of said cranks.

9. A shear mechanism for continuous flow feeders comprising a blade located on each side of the stream to be severed, a pivoted linkage support for each blade, means for turning said linkage supports to move said blades into and with the stream to accomplish a severance thereof, means for releasably locking said blades in their lowermost position, and means for retracting the locked blades from contact with the stream.

10. A shear mechanism for continuous flow feeders comprising a blade located on each side of the stream to be severed, a pivoted linkage support for each blade, means for turning said linkage supports to move said blades into and with the stream to accomplish a severance thereof, means for releasably locking said blades in their lowermost position, means for withdrawing the locked blades from severing position along a line at right angles to the stream, and means for releasing said blade-locking means after the blades have been withdrawn.

11. A shear mechanism for continuous flow feeders comprising blades located on each side of the stream to be severed, means for moving said blades into and with the stream to accomplish a severance thereof, means for releasably locking said blades in their lowermost position, means for withdrawing the locked blades from severing position along a line at right angles to the stream, means for releasing the blade-locking means after the blades have been withdrawn from contact with the stream and while still in their lowermost position, and means for returning said blades to their initial position.

12. A mechanism for severing a continuously flowing stream of molten glass comprising a pair of opposed shear blades, means for moving each of said blades through intersecting circular paths to cause said blades to cross each other in cutting engagement with said stream, and means for periodically varying the speed of said blades along their respective paths.

13. A mechanism for severing a continuously flowing stream of molten glass comprising a pair of opposed shear blades, means for rotating said blades in vertical planes in opposite directions to cause the blades to travel in intersecting circular paths and cross each other in cutting engagement with the stream, and means for periodically varying the speed of rotation of said blades.

14. A shear mechanism comprising a pair of opposed shear blades, pivoted supports for each of said blades, and means for turning said pivoted supports to move said blades in a cycloidal path in cutting engagement with each other.

15. A shear mechanism comprising a pair of opposed shear blades, pivoted supports for each of said blades, means for turning said pivoted supports to move the blades in a cycloidal path into cutting engagement with each other, and means for shifting the pivots of said supports laterally to move said blades laterally in a straight line to retract said blades.

16. A shear mechanism comprising a pair of opposed shear blades, a pivoted link support for each blade, and means for rotating said link supports to move each blade through a circular path, said link supports being so positioned that the paths described by said blades intersect each other.

17. A shear mechanism comprising a pair of opposed shear blades, pivoted parallel links supporting each said blade, and means for turning said links to move said blades through an arcuate path into cutting engagement with each other.

18. A shear mechanism for severing a suspended stream of molten glass comprising a pair of opposed shear blades, a sliding frame for each blade, parallel links pivotally connecting each such blade with its frame, means for reciprocating said frames, means responsive to the movement of said frames in one direction for turning said parallel links to move said blades downwardly in an arcuate path into cutting engagement with each other, means for holding said blades in their lowered position, and means responsive to the movement of said frames in the opposite direction for releasing said holding means.

19. A shear mechanism for severing mould charges from a downwardly flowing stream of molten glass comprising shear blades located on opposite sides of the stream to be cut, means for moving said blades toward each other into the confines of said stream, means responsive to such movement of said blades for imparting a downward motion thereto whereby the blades move in an arcuate path while accomplishing a severance, and means for retracting said blades from the stream.

20. A shear mechanism for severing mould charges from a downwardly flowing stream of molten glass comprising shear blades located on opposite sides of the stream to be cut, means for moving said blades toward each other into the confines of said stream, means responsive to such movement of the blades for imparting a downward motion thereto whereby the blades move in an arcuate path while accomplishing a severance, and means for withdrawing each such blade in a straight line path at right angles to the axis of said stream.

FRANK L. O. WADSWORTH.